(12) United States Patent
Kawakita et al.

(10) Patent No.: US 7,715,300 B2
(45) Date of Patent: May 11, 2010

(54) DIFFRACTION ELEMENT, OBJECTIVE LENS UNIT, OPTICAL PICKUP AND OPTICAL DISC APPARATUS

(75) Inventors: Satoshi Kawakita, Tokyo (JP); Motoo Aiba, Tokyo (JP); Kyu Kanno, Miyagi (JP); Jin Sato, Miyagi (JP); Takatoshi Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 545 days.

(21) Appl. No.: 11/684,133

(22) Filed: Mar. 9, 2007

(65) Prior Publication Data

US 2007/0230311 A1    Oct. 4, 2007

(30) Foreign Application Priority Data

Mar. 31, 2006    (JP)    ............................. 2006-098706

(51) Int. Cl.
*G11B 7/00*    (2006.01)
(52) U.S. Cl. ............................. 369/112.05; 369/112.07; 369/112.23; 369/112.04
(58) Field of Classification Search .................. 359/566, 359/569, 572, 574, 575, 576; 369/112.04, 369/112.07, 112.23, 112.05, 112.08
See application file for complete search history.

(56) References Cited

U.S. PATENT DOCUMENTS

| | | | |
|---|---|---|---|
| 6,523,963 B2* | 2/2003 | Nakabayashi | 359/513 |
| 2005/0001975 A1* | 1/2005 | Ishihara et al. | 349/201 |
| 2005/0063282 A1* | 3/2005 | Takada et al. | 369/112.04 |
| 2006/0268414 A1* | 11/2006 | Tokoyoda | 359/569 |
| 2007/0104071 A1* | 5/2007 | Asoma | 369/112.05 |

FOREIGN PATENT DOCUMENTS

JP    2005-302270    10/2005

* cited by examiner

*Primary Examiner*—Thang V Tran
*Assistant Examiner*—Brenda Bernardi
(74) *Attorney, Agent, or Firm*—Oblon, Spivak, McClelland, Maier & Neustadt, L.L.P.

(57) ABSTRACT

A diffraction element for diffracting a particular wavelength of incident optical beam includes: a base section made from a first resin and provided with a predetermined diffraction pattern; and a cover section made from a second resin and covering the diffraction pattern, wherein a rate of change of refraction index of the first resin is substantially the same as a rate of change of refraction index of the second resin in a temperature range between a first temperature and a second temperature.

9 Claims, 9 Drawing Sheets

| Refraction Index | BD Wavelength $\lambda_b$ | DVD Wavelength $\lambda_d$ | CD Wavelength $\lambda_c$ |
|---|---|---|---|
| nA | 1.6752 | 1.6288 | 1.6192 |
| nB | 1.5246 | 1.5062 | 1.5032 |
| nA−nB | 0.1506 | 0.1226 | 0.1160 |

| Refraction Indexes Difference (nA−nB) | BD Wavelength $\lambda_b$ | DVD Wavelength $\lambda_d$ | CD Wavelength $\lambda_c$ |
|---|---|---|---|
| 25°C | 0.1506 | 0.1226 | 0.1160 |
| 75°C | 0.1507 | 0.1230 | 0.1158 |
| Variation ΔAB | +0.0001 | +0.0004 | −0.0002 |

| Diffraction Efficiency E F | BD Wavelength $\lambda_b$ | DVD Wavelength $\lambda_d$ | CD Wavelength $\lambda_c$ |
|---|---|---|---|
| 25°C | 100% | 100% | 88% |
| 75°C | 100% | 100% | 88% |

FIG.10

| | BD Wavelength $\lambda_b$ | DVD Wavelength $\lambda_d$ | CD Wavelength $\lambda_c$ |
|---|---|---|---|
| Maximum Variation for Diffraction Efficiency E Fmax | 0.3% | ≦0.1% | ≦0.1% |

FIG.11

DIFFRACTION ELEMENT, OBJECTIVE LENS UNIT, OPTICAL PICKUP AND OPTICAL DISC APPARATUS

CROSS REFERENCES TO RELATED APPLICATIONS

The present invention contains subject matter related to Japanese Patent Application JP2006-098706 filed in the Japanese Patent Office on Mar. 31, 2006, the entire contents of which being incorporated herein by reference.

BACKGROUND OF THE INVENTION

1. Field of the Invention

The present invention relates to a diffraction element, objective lens unit, optical pickup and optical disc apparatus, and is preferably applied to an optical disc device, for example.

2. Description of Related Art

There is an optical disc device that supports a plurality of types of optical discs: Compact Disc (CD), Digital Versatile Disc (DVD) and "Blu-ray Disc (Registered Trademark)" (BD). The wavelengths of laser beam vary according to the types of optical discs.

As an optical pickup for the optical disc device, there is one capable of collecting different wavelengths of laser beams by a diffraction element and a subsequent objective lens: Considering different focal distances of the optical discs, the diffraction element only diffracts particular wavelengths of laser beams while laser beams of other wavelengths passes through it without being diffracted.

This kind of diffraction element includes a step-like diffraction pattern made from a resin, and a plane cover layer made from the other resin to cover the diffraction pattern (see Jpn. Pat. Laid-open Publication No. 2005-302270, for example).

SUMMARY OF THE INVENTION

By the way, it is known that the diffraction efficiency of the diffraction elements is determined by the wavelength of the laser beam, the shape of the diffraction pattern, and the difference of refraction indexes between the cover layer and the diffraction pattern.

Generally, the refraction indexes of resins vary according to temperatures. It means that if the optical disc device is in a different environment or different temperature, its refraction index will change accordingly, affecting the refraction indexes difference. That brings on problems that the diffraction efficiency is hardly stabilized at desired levels.

The present invention has been made in view of the above points and is intended to provide a diffraction element, objective lens unit, optical pickup and optical disc apparatus with stabilized diffraction efficiencies despite temperature change.

In one aspect of the present invention, a diffraction element for diffracting a particular wavelength of incident optical beam includes: a base section made from a first resin and provided with a predetermined diffraction pattern; and a cover section made from a second resin and covering the diffraction pattern, wherein a rate of change of refraction index of the first resin is substantially the same as a rate of change of refraction index of the second resin in a temperature range between a first temperature and a second temperature.

Accordingly, in the temperature range between the first and second temperatures, the rate of change of refraction index of the first resin compensates for that of the second resin. It means that the refraction indexes difference between the first resin and the second resin is substantially stabilized.

According to an embodiment of the present invention, in the temperature range between the first and second temperatures, the rate of change of refraction index of the first resin compensates for that of the second resin. It means that the refraction indexes difference between the first resin and the second resin is substantially stabilized. Thus, the diffraction element, objective lens unit, optical pickup and optical disc apparatus according to an embodiment of the present invention have the diffraction efficiency stabilized despite temperature changes.

The nature, principle and utility of the invention will become more apparent from the following detailed description when read in conjunction with the accompanying drawings in which like parts are designate by like reference numerals or characters.

DETAILED DESCRIPTION OF PREFERRED EMBODIMENTS

An embodiment of the present invention will be described in detail with reference to the accompanying drawings.

Figure 1:
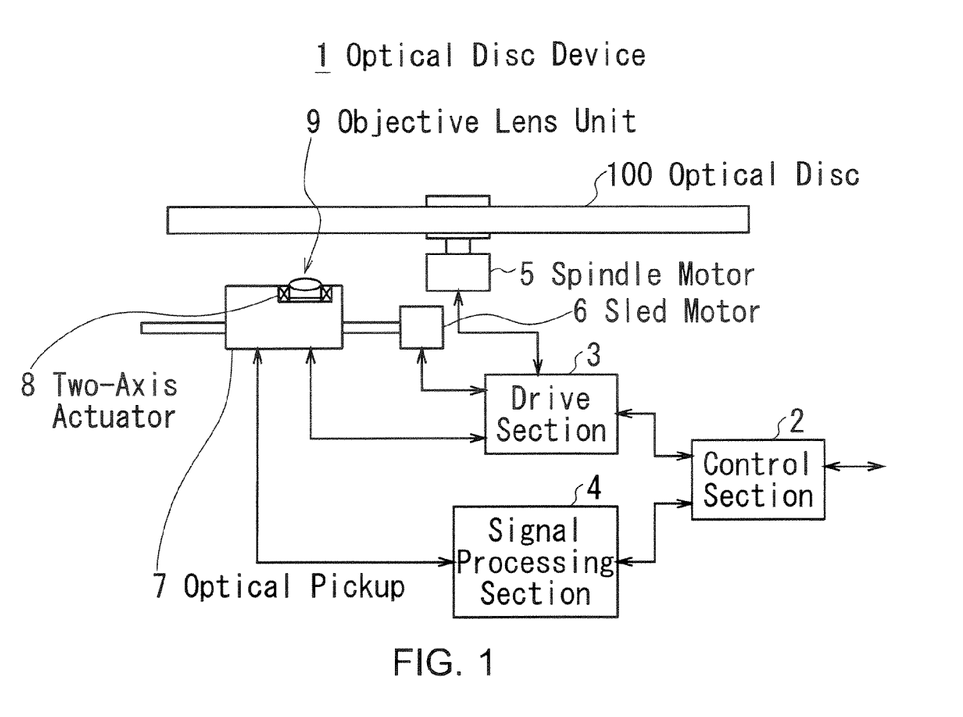
FIG. 1 is a schematic diagram illustrating the overall configuration of an optical disc device.

(1) Configuration of Optical Disc Device (1-1) Overall Configuration of Optical Disc Device FIG. 1 shows an optical disc device 1 that supports an optical disc 100 of CD, DVD and BD. The optical disc device 1 reproduces signals from the optical disc 100.

A control section 2 takes overall control of the optical disc device 1. After the optical disc 100 is inserted into the optical disc device 1, the control section 2 controls, in response to a playback command or the like from external devices (not shown), a drive section 3 and a signal processing section 4 to reproduce information from the optical disc 100.

The signal processing section 4 is controlled by the control section 2. The signal processing section 4 controls an optical pickup 7 to emit an optical beam to the optical disc 100 from an objective lens unit 9.

The drive section 3 under the control of the control section 2 controls a spindle motor 5 to rotate the optical disc 100 at appropriate speeds. The drive section 3 also controls a sled motor 6 to bring an optical pickup 7 in a direction of tracking or the radial direction of the optical disc 100. The drive section 3 also controls a two-axis actuator 8 to bring an objective lens unit 9 in a direction of focusing or close to the optical disc 100, or in a direction of tracking away from the optical disc 100. In this manner, the optical beam is focused on a target track on the optical disc 100.

The signal processing section 4 detects the reflection from the signal recording surface of the optical disc 100, and produces a reproduction signal based on the detected result, and then supplies the reproduction signal to an external device (not shown) through the control section 2.

The optical pickup 7 supports three types of wavelength when emitting the optical beam through the objective lens unit 9; the wavelength of 780 nm of the optical beam for the CD-type optical disc 100c; the wavelength of 650 nm of the optical beam for the DVD-type optical disc 100d; and the wavelength of 405 nm of the optical beam for the BD-type optical disc 100b.

When reproducing signals from the optical disc 100, the optical disc device 1 chooses, in accordance with the type of the optical disc 100, one of the above beams and then emits it to the optical disc 100.

(1-2) Configuration of Optical Pickup

Figure 2:
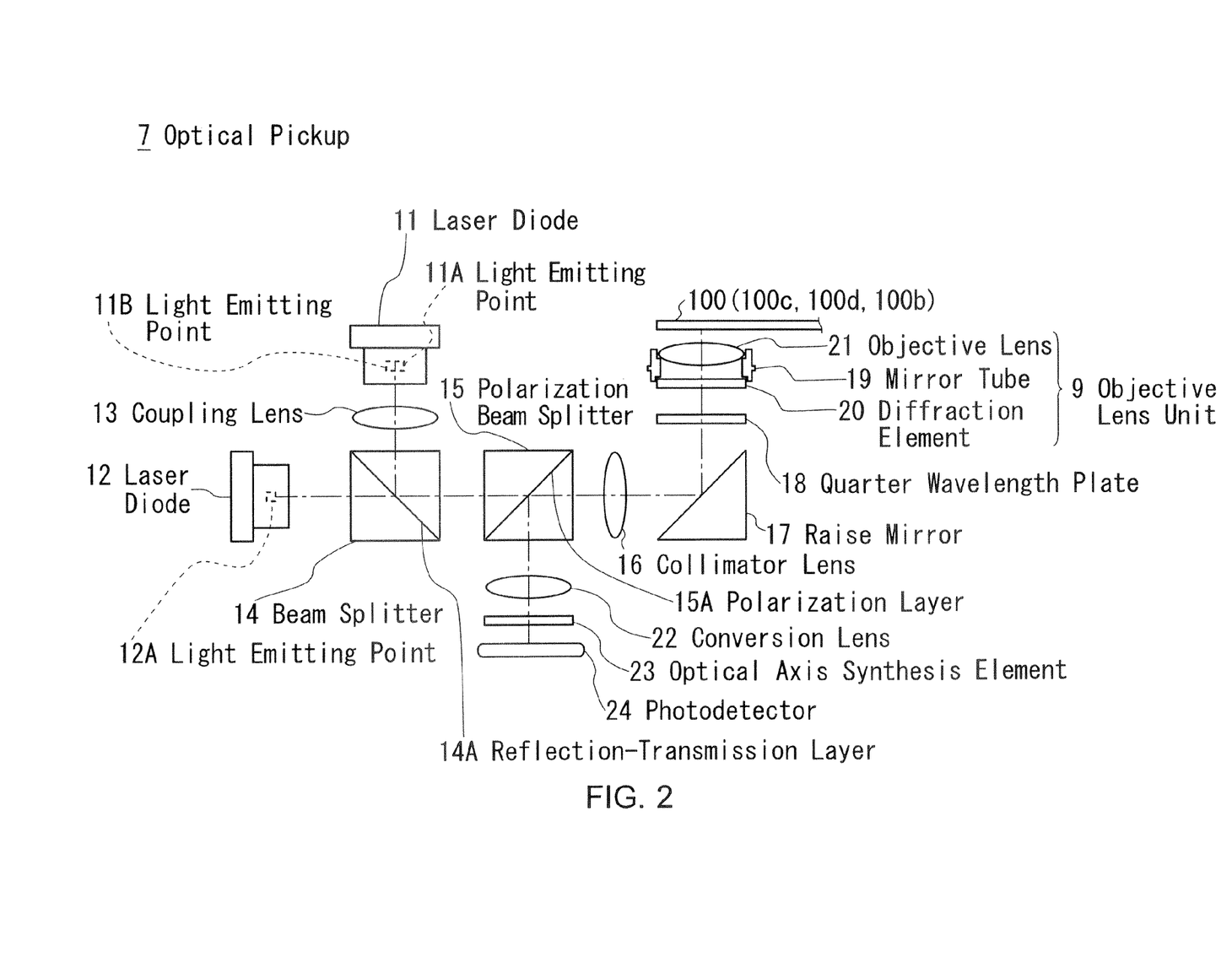
FIG. 2 is a schematic diagram illustrating the configuration of an optical pickup.

As shown in FIG. 2, the optical pickup 7 includes sources of the optical beams: a laser diode 11 to emit the optical beams of 780 and 650 nm wavelengths for the CD- and DVD-types, respectively; and a laser diode 12 to emit the optical beam of 405 nm wavelengths for the BD-type. The optical beam for CD will be also referred to as a "CD-type optical beam Lc" while the optical beam for DVD and BD will be also referred to as a "DVD-type optical beam Ld" and a "BD-type optical beam Lb", respectively.

A coupling lens 13 changes the optical magnification of the optical beam from the laser diode 11.

The optical beam of particular wavelengths is reflected on a reflection-transmission layer 14A of a beam splitter 14 while the optical beam with other wavelengths passes through the reflection-transmission layer 14A; the CD-type optical beam Lc of around 780 nm and the DVD-type optical beam Ld of about 650 nm are reflected on the reflection-transmission layer 14A while the BD-type optical beam LD of about 405 nm passes through the reflection-transmission layer 14A.

The optical beam with particular polarization angles is reflected on a polarization layer 15A of a polarization beam splitter 15 while the optical beam of other polarization angles passes through the polarization layer 15A; the incident optical beam from the beam splitter 14 passes through the polarization layer 15A while the incident optical beam from a collimator lens 16, whose polarization angles have been adjusted, is reflected on the polarization layer 15A.

The collimator lens 16 collimates the divergent light, which is the incident optical beam from the polarization beam splitter 15, and transforms the collimated optical beam from a raise mirror 17 into convergent light.

The horizontal optical beam from the collimator lens 16 is reflected on the raise mirror 17 and then travels in the vertical direction or a direction perpendicular to the optical disc 100; the vertical optical beam from a quarter wavelength plate 18 is reflected on the raise mirror 17 and then travels in the horizontal direction.

As for a part of the optical beam, its phase is delayed by one quarter of a wavelength through the quarter wavelength plate 18. This transforms the optical beam from the raise mirror 17 from linearly polarized light into circularly polarized light while it transforms the optical beam from the objective lens unit 9 from circularly polarized light into linearly polarized light.

Figure 3:
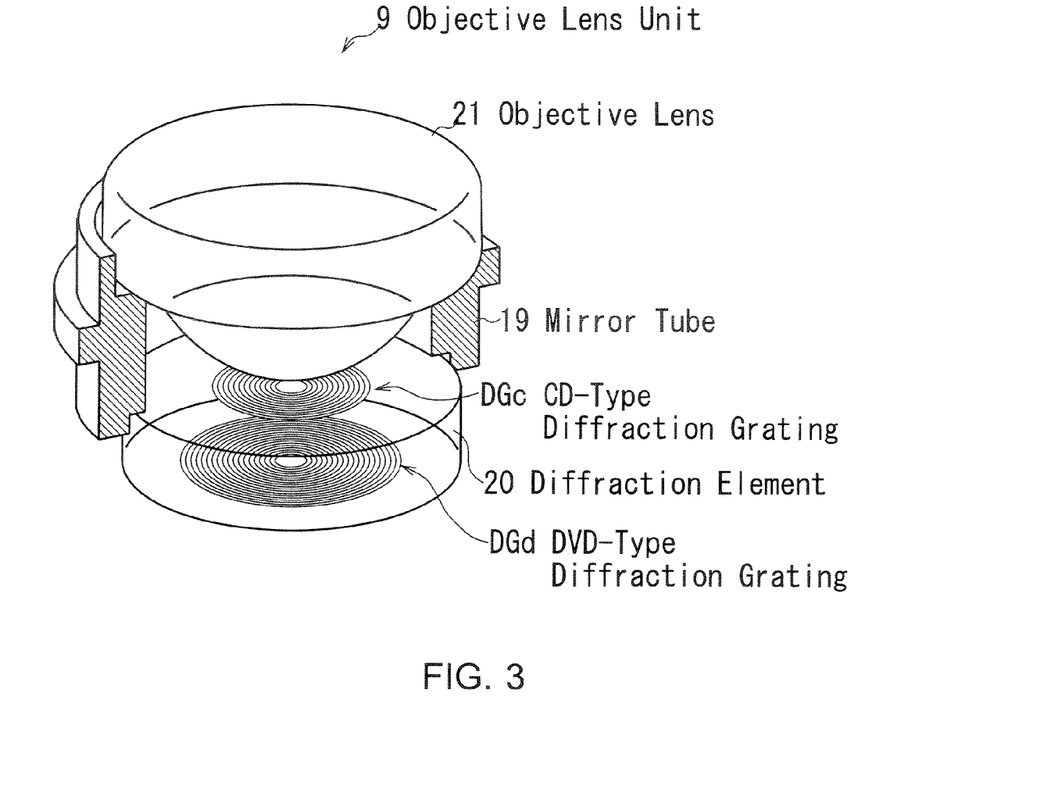
FIG. 3 is a schematic diagram illustrating the configuration of an objective lens unit.

As shown in FIG. 3 where a part of the cutting surface of the objective lens unit 9 is illustrated, a plane disc-shaped diffraction element 20 is attached to the bottom of a mirror tube 19. The objective lens 21 is placed between the top and middle areas of the mirror tube 19; the objective lens 21 includes a disc-shaped section whose size is almost the same as the diffraction element 20 and a smaller-diameter spindle-shaped section which is formed on the under surface of the disc-shaped section.

The objective lens unit 9 transforms the collimated optical beam from the quarter wavelength plate 18 into convergent light through the diffraction element 20 and the objective lens 21 to bring it to a focal point on the optical disc 100.

In the optical pickup 7, the optical beam diverged on the signal recording surface of the optical disc 100 is collimated through the objective lens 21 and diffraction element 20 of the objective lens unit 9. The optical beam is then transformed from circularly polarized light to linearly polarized light through the quarter wavelength plate 18. The optical beam then travels in the horizontal direction to the polarization beam splitter 15 after being reflected on the raise mirror 17. Before getting into the polarization beam splitter 15, the optical beam is transformed from collimated light to convergent light through the collimator lens 16.

In this case, the optical beam with particular polarization angles is reflected on the polarization layer 15A of the polarization beam splitter 15. After that, the optical beam gets into a conversion lens 22.

The conversion lens 22 changes the optical magnification of the CD-type optical beam Lc, the DVD-type optical beam Ld and the BD-type optical beam Lb. A optical axis synthesis element 23 makes the optical axes of the CD-type optical beam Lc and DVD-type optical beam Ld from the laser diode 11 and that of the BD-type optical beam Lb from the laser diode 12 all together.

On the surface of a photodetector 24 that is designed to receive the optical beam from the optical axis synthesis element 23 via the conversion lens 22, a plurality of detection cells in a predetermined shape is formed. The detection cells detect the optical beam and then photoelectric-convert it. The detection cells subsequently supply resultant detection signals to the signal processing section 4 (FIG. 1).

The signal processing section 4 performs a predetermined calculation process and other processes using the detection signals from the photodetector 24 (FIG. 2) to obtain reproduction RF signals, and then performs, based on the reproduction RF signals, predetermined decoding and demodulation processes and the like to produce reproduction signals.

In addition, the signal processing section 4 (FIG. 1) performs, using the detection signals from the photodetector 24 (FIG. 2), a predetermined calculation process and other processes to produce drive control signals such as trucking error signals and focus error signals, and then supplies the drive control signals to the control section 2. As a result, the control section 2 performs, through the drive section 3, control processes such as trucking and focus control to adjust the optical (1-2-1) CD-Type Optical Disc When the control section 2 (FIG. 1) determines, based on a predetermined disc type determination method, that the optical disc 100 is CD-type (100c), the control section 2 controls the laser diode 11 of the optical pickup 7 (FIG. 2) to emit the CD-type optical beam Lc, or divergent light, from the light emitting point 11A to the beam splitter 14 via the coupling lens 13.

The CD-type optical beam Lc is reflected on the reflection-transmission layer 14A of the beam splitter 14, and then passes through the polarization beam splitter 15. The CD-type optical beam Lc is subsequently collimated by the collimator lens 16, and then reflected on the raise mirror 17 to travel in the vertical direction. The CD-type optical beam Lc is subsequently converted by the quarter wavelength plate 18 from linearly polarized light into circularly polarized light, and then reaches the objective lens unit 9.

The objective lens unit 9 converts, through the diffraction element 20 and the objective lens 21, the CD-type optical beam Lc from the quarter wavelength plate 18 into convergent light, and leads it to the focus point on the signal recording surface of the CD-type optical disc 100c.

The objective lens unit 9 subsequently collimates, through the objective lens 21 and the diffraction element 20, the divergent CD-type optical beam Lc which is the reflection from the signal recording surface of the CD-type optical disc 100c, and then leads it to the quarter wavelength plate 18.

After that, in the optical pickup 7, the CD-type optical beam Lc is converted by the quarter wavelength plate 18 from circularly polarized light to linearly polarized light, and then is reflected on the raise mirror 18 to travel in the horizontal direction. The CD-type optical beam Lc is subsequently converted by the collimator lens 16 from collimated light to convergent light, and then reflected on the polarization layer 15A of the polarization beam splitter 15. After that, the CD-type optical beam Lc passes through the conversion lens 22 and the optical axis synthesis element 23 to reach the photodetector 24.

The detection cells of the photodetector 24 detect the CD-type optical beam Lc, and transmit the resultant detection signals to the signal processing section 4 (FIG. 1).

The signal processing section 4 produces, based on the detection signals, the reproduction RF signals, and then generates, based on the reproduction RF signals, the reproduction signals. On the other hand, the signal processing section 4 produces the drive control signals such as trucking error signals and focus error signals.

(1-2-2) DVD-Type Optical Disc

When the control section 2 (FIG. 1) determines, based on a predetermined disc type determination method, that the optical disc 100 is DVD-type (100d), the control section 2 controls the laser diode 11 of the optical pickup 7 (FIG. 2) to emit the DVD-type optical beam Ld, or divergent light, from the light emitting point 11B to the beam splitter 14 via the coupling lens 13. In a similar way to that of the CD-type optical disc 100c, the DVD-type optical beam Ld is reflected on or passes through the following components: the coupling lens 13, the beam splitter 14, the polarization beam splitter 15, the collimator lens 16, the raise mirror 17 and the quarter wavelength plate 18. After that, the DVD-type optical beam Ld is converted into convergent light through the diffraction element 20 and objective lens 21 of the objective lens unit 9, and then is focused on the signal recording surface of the DVD-type optical disc 100d.

After that, in a similar way to that of the CD-type optical disc 100c, the objective lens 21 and diffraction element 20 of the objective lens unit 9 collimate the divergent DVD-type optical beam Ld, which is the reflection from the signal recording surface of the DVD-type optical disc 100d. The DVD-type optical beam Ld is subsequently reflected on or passes through the following components: the quarter wavelength plate 18, the raise mirror 17, the collimator lens 16, the polarization beam splitter 15, the conversion lens 22 and the optical axis synthesis element 23. As a result, the DVD-type optical beam Ld reaches the photodetector 24.

In a similar way to that of the CD-type optical disc 100c, the detection cells of the photodetector 24 detect the DVD-type optical beam Ld, and transmit the resultant detection signals to the signal processing section 4 (FIG. 1).

The signal processing section 4 produces, based on the detection signals, the reproduction RF signals, and then generates, based on the reproduction RF signals, the reproduction signals. On the other hand, the signal processing section 4 produces the drive control signals such as trucking error signals and focus error signals.

(1-2-3) BD-Type Optical Disc

When the control section 2 (FIG. 1) determines, based on a predetermined disc type determination method, that the optical disc 100 is BD-type (100b), the control section 2 controls the laser diode 12 of the optical pickup 7 (FIG. 2) to emit the BD-type optical beam Lb, or divergent light, from the light emitting point 12A to the beam splitter 14.

In this case, the BD-type optical beam Lb passes through the reflection-transmission layer 14A of the beam splitter 14, and goes into the polarization beam splitter 15.

After that, in a similar way to that of the CD-type optical disc 100c, the BD-type optical beam Lb is reflected on or passes through the following components: the polarization beam splitter 15, the collimator lens 16, the raise mirror 17 and the quarter wavelength plate 18. After that, the BD-type optical beam Lb is converted into convergent light through the objective lens 21 of the objective lens unit 9, and then is focused on the signal recording surface of the BD-type optical disc 100b.

By the way, in this case, the objective lens unit 9 allows the BD-type optical beam Lb to pass through the diffraction element 20. It means that the diffraction element 20 does not diffract the BD-type optical beam Lb (described later).

After that, in a similar way to that of the CD-type optical disc 100c, the objective lens 21 of the objective lens unit 9 collimates the divergent BD-type optical beam Lb, which is the reflection from the signal recording surface of the BD-type optical disc 100b. The BD-type optical beam Lb is subsequently reflected on or passes through the following components: the quarter wavelength plate 18, the raise mirror 17, the collimator lens 16, the polarization beam splitter 15, the conversion lens 22 and the optical axis synthesis element 23. As a result, the BD-type optical beam Lb reaches the photodetector 24.

In a similar way to that of the CD-type optical disc 100c, the detection cells of the photodetector 24 detect the BD-type optical beam Lb, and transmit the resultant detection signals to the signal processing section 4 (FIG. 1).

The signal processing section 4 produces, based on the detection signals, the reproduction RF signals, and then generates, based on the reproduction RF signals, the reproduction signals. On the other hand, the signal processing section 4 produces the drive control signals such as trucking error signals and focus error signals.

In this manner, the optical pickup 7 supports the CD-type optical disc 100c, the DVD-type optical disc 100d and the BD-type optical disc 100b: with the objective lens unit 9, the CD-type optical beam Lc, the DVD-type optical beam Ld and the BD-type optical beam Lb are focused on the signal recording surface of the optical disc 100 appropriately, and their reflection are correctly detected by the photodetector 24.

(1-3) Configuration of Objective Lens Unit

Figure 4:
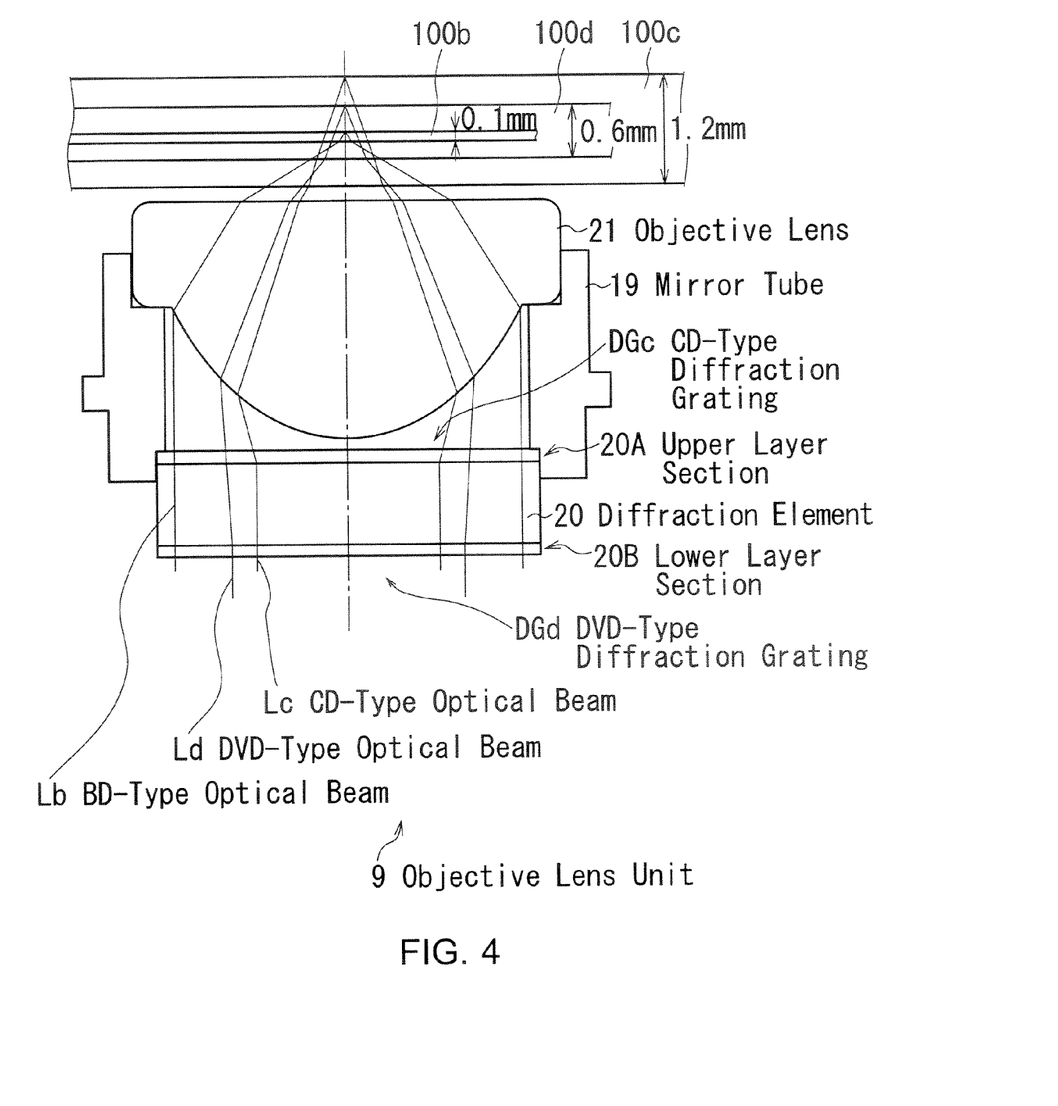
FIG. 4 is a schematic diagram illustrating light paths inside the objective lens unit.

FIG. 4 is an enlarged sectional view of the CD-type optical disc 100c, the DVD-type optical disc 100d, the BD-type optical disc 100b and the objective lens unit 9.

By the way, FIG. 4 does not illustrate the two-axis actuator 8 (FIG. 1) which is attached to the objective lens unit 9.

As for CD-, DVD- and BD-types, the following are standardized for compatibility: the wavelengths of optical beam to read out information; numerical apertures for collecting the optical beam; and the thickness of the optical discs 100 between the lower surface and the signal recording surface, or the thickness of the cover layer.

In reality, the CD-type optical disc is standardized in the following manner: the wavelength is approximately 780 nm; numerical apertures are approximately 0.45; and the thick of the cover layer is 1.2 mm. The DVD-type optical disc is standardized in the following manner: the wavelength is approximately 650 nm; numerical apertures are approximately 0.65; and the thick of the cover layer is 0.6 mm. The BD-type optical disc is standardized in the following manner: the wavelength is approximately 405 nm; numerical apertures are approximately 0.85; and the thick of the cover layer is 0.1 mm. The wavelengths $\lambda$ for CD-, DVD- and BD-types are also represented as $\lambda c$, $\lambda d$ and $\lambda b$, respectively.

In addition, as for the CD-type optical beam Lc, the DVD-type optical beam Ld and the BD-type optical beam Lb, their focal distances, the distances between the objective lens 21 and their focal points, are different due to the characteristics of the objective lens 21.

Accordingly, in the optical disc device 1, the two-axis actuator 8 (FIG. 1) adjusts the distance between the objective lens unit 9 and the optical disc 100 to have the optical beam focused on the signal recording surface of the optical discs: the two-axis actuator 8 appropriately positions the objective lens unit 9 with respect to the optical disc 100 fixed at predetermined position.

By the way, for ease of explanation, FIG. 4 illustrates the optical discs 100 whose positions are being adjusted with respect to the fixed objective lens unit 9, resulting in different distances between the objective lens 9 and each optical disc's lower surface. In addition, FIG. 4 only illustrates the cover layers of the CD-type optical disc 100c, DVD-type optical disc 100d and BD-type optical disc 100b.

Considering the relative intensity of the BD-type optical beam Lb, the numerical apertures for BD-type and the like, the objective lens 21 is mainly designed for the BD-type optical beam Lb rather than the CD-type optical beam Lc and the DVD-type optical beam Ld.

Accordingly, when the collimated BD-type optical beam Lb reaches the lower surface of the objective lens 21 of the objective lens unit 9, the objective lens 21 converts this incident BD-type optical beam Lb into convergent light to have it focused on the signal recording surface of the BD-type optical disc 100b.

However, the objective lens 21 is designed for the BD-type optical beam Lb as mentioned above: if the collimated CD-type optical beam Lc or DVD-type optical beam Ld gets into the objective lens 21 via its lower surface, it may cause an aberration while the objective lens 21 converts it into convergent light. As a result, the optical beam may not be focused on the signal recording surface of the optical disc 100 appropriately.

Accordingly, the diffraction element 20 of the objective lens unit 9 only diffracts the CD-type optical beam Lc and DVD-type optical beam Ld to supply them to the objective lens 21 as non-collimated light. On the other hand, as the collimated BD-type optical beam comes in, the diffraction element 20 supplies it to the objective lens 21 as collimated light.

As a matter of fact, on an upper layer section 20A of the diffraction element 20, a diffraction grating for CD (also referred to as "CD-type diffraction grating") DGc, or hologram, is formed to diffract only the CD-type optical beam Lc, not the DVD-type optical beam Ld and the BD-type optical beam Lb. As shown in FIG. 4, the CD-type optical beam Lc is slightly diffracted outward by the CD-type diffraction grating DGc.

That is to say, the upper layer section 20A of the diffraction element 20 allows the DVD-type optical beam Ld and the BD-type optical beam Lb to pass through it while selectively diffracting the CD-optical beam Lc. In other words, the upper layer section 20A of the diffraction element 20 is designed to only correct the aberration for the CD-type optical beam Lc.

After that, as shown in FIG. 4, the CD-type optical beam Lc from the diffraction element 20 is refracted through the lower and upper surfaces of the objective lens 21. This converts the CD-type optical beam Lc into convergent light. In this manner, the objective lens unit 9 corrects the aberration for the CD-type optical beam Lc, and leads the CD-type optical beam Lc from the objective lens 21 to a focal point on the signal recording surface of the CD-type optical disc 100c.

In addition, on a lower layer section 20B of the diffraction element 20, a diffraction grating for DVD (also referred to as "DVD-type diffraction grating") DGd, or hologram, is formed to diffract only the DVD-type optical beam Ld, not the CD-type optical beam Lc and the BD-type optical beam Lb. As shown in FIG. 4, the DVD-type optical beam Ld is slightly diffracted outward by the DVD-type diffraction grating DGd.

That is to say, the lower layer section 20B of the diffraction element 20 allows the CD-type optical beam Lc and the BD-type optical beam Lb to pass through it while selectively diffracting the DVD-optical beam Ld. In other words, the lower layer section 20B of the diffraction element 20 is designed to only correct the aberration for the DVD-type optical beam Ld.

After that, as shown in FIG. 4, the DVD-type optical beam Ld from the diffraction element 20 is refracted through the lower and upper surfaces of the objective lens 21. This converts the DVD-type optical beam Ld into convergent light. In this manner, the objective lens unit 9 corrects the aberration for the DVD-type optical beam Ld, and leads the DVD-type optical beam Ld from the objective lens 21 to a focal point on the signal recording surface of the DVD-type optical disc 100d.

In this manner, in the objective lens unit 9, the upper layer section 20A of the diffraction element 20 only corrects the aberration for the CD-type optical beam Lc by diffracting it while the lower layer section 20B of the diffraction element 20 only corrects the aberration for the DVD-type optical beam Ld by diffracting it. That can appropriately lead the CD-type optical beam Lc, the DVD-type optical beam Ld or the BD-type optical beam Lb to focal points of the signal recording surface of the CD-type optical disc 100c, the DVD-type optical disc 100d or the BD-type optical disc 100b even after they pass through the objective lens 21 designed for the BD-type optical beam Lb.

(1-4) Configuration of Diffraction Element

Figure 5A:
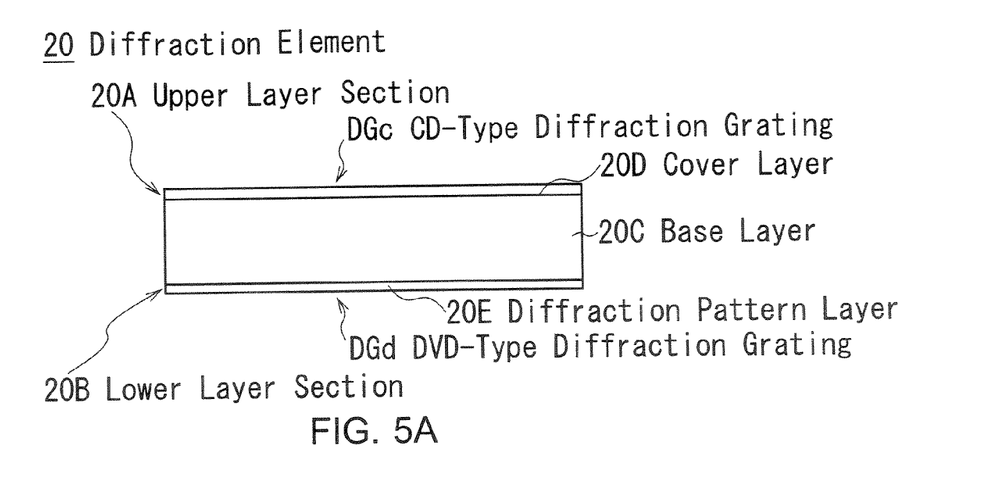
FIGS. 5A and 5B are schematic diagrams illustrating the configuration of a diffraction element.

As shown in FIG. 5A, the diffraction element 20 includes a flat, disc-shaped base layer 20C. Its upper layer section 20A includes the CD-type diffraction grating DGc while its lower layer section 20B includes the DVD-type diffraction grating DGd, as mentioned above.

The base layer 20C is for example made from transparent synthetic resin with a predetermined refractive index. Its interface to air or other materials can diffract the optical beam. A base material (also represented as RB), a resin from which the base layer 20C is made is cyclo olefin polymer or the like whose glass transition point $Tg_B$ is 168 degrees Celsius.

Figure 5B:
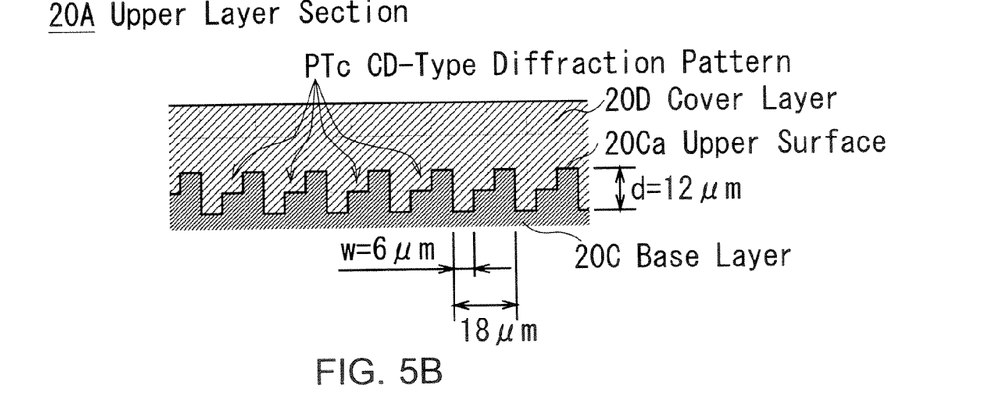

FIG. 5B is an enlarged sectional view of the upper layer section 20A. The CD-type diffraction pattern PTc is formed on an upper surface of the base layer 20C: the CD-type diffraction pattern PTc includes a plurality of step-like protruding parts located at certain intervals. The CD-type diffraction pattern PTc is covered by a cover layer 20D that is for example made from transparent resin.

The step-like CD-type diffraction pattern PTc includes three steps for each protruding part: the height of the protruding parts from bottom to top is 12 μm; and the interval of protruding parts, or the distance between one protruding part to the adjoining protruding part, is 18 μm. As shown in FIG. 3, the CD-type diffraction pattern PTc is concentrically formed on the upper surface of the diffraction element 20 within one-half radius from the center.

The cover layer 20D is made from a transparent material whose refraction index is different from that of the base layer 20C. A lower surface of the cover layer 20D is attached to the CD-type diffraction pattern PTc without no space between them. An upper surface of the cover layer 20D is substantially flat. A cover material (also represented as RA), a resin from which the cover layer 20D is made is an acrylic, ultraviolet curable resin: A glass transition point $Tg_A$ of the cured is 88 degrees Celsius.

In this manner, the upper layer section 20A of the diffraction element 20 includes the step-like CD-type diffraction pattern PTc whose protruding portions are located at certain intervals on the upper surface of the base layer 20C. On the CD-type diffraction pattern PTc, the cover layer 20D is formed: the refraction index of the cover layer 20D is different from that of the base layer 20C. Accordingly, the upper layer section 20A diffracts the optical beam of particular wavelengths while the optical beam of other wavelengths passes through it without being diffracted. In this case, the CD-type diffraction grating DGc only diffracts the CD-type optical beam Lc.

Figure 6:
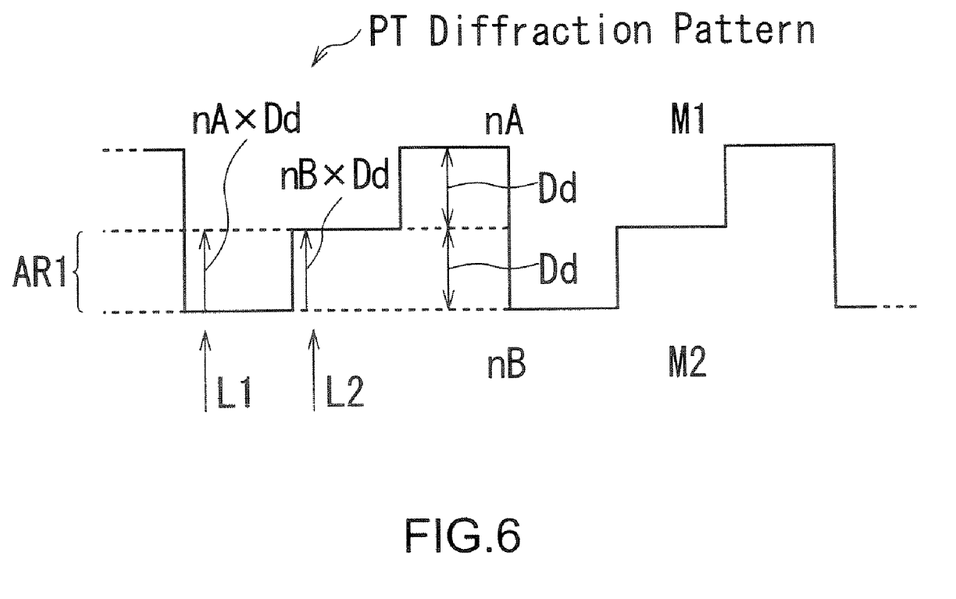
FIG. 6 is a schematic diagram illustrating a difference between optical paths on a diffraction grating.

FIG. 6 is a schematic diagram detailing the configuration of the CD-type diffraction pattern PTc. With the general step-like diffraction patterns PT, particular wavelengths λ of optical beams pass through it (referred to as "zero-order diffraction") while other wavelengths λ of optical beams are diffracted by it (referred to as "first-order diffraction"). The following describes an optical path of the optical beam PT that passes through the diffraction pattern PT, especially detailing an area AR1.

The optical path of the optical beam L1 that passes through the area AR1 including only one protruding portion is represented as (nA×Dd) because the optical beam L1 passes through a substance M1 with a refraction index nA. Similarly, the optical path of the optical beam L2 that passes through the area AR1 including only one protruding portion is represented as (nB×Dd) because the optical beam L2 passes through a substance M2 with a refraction index nB.

As indicated by a formula (1) below, when the optical paths of the optical beams L1 and L2 are equal to the wavelengths λ multiplied by the whole numbers S, the optical beams L1 and L2 are not diffracted. It means the zero-order diffraction, gaining the highest diffraction efficiency EF0 for the optical beams L1 and L2.

$$nA \times Dd - nB \times Dd = S \times \lambda \quad (1)$$

Transformation of the formula (1) results in a formula (2) shown below: a zero-order diffraction difference Dd0 is one capable of gaining the highest diffraction efficiency EF0 in terms of the zero-order diffraction. The zero-order diffraction difference Dd0 is calculated by the processes of: multiplying the wavelength λ of the laser beam by the whole number S (S: any integer); subtracting the refraction index nB of the substance M2 (from which the diffraction pattern PT is made) from the refraction index nA of the substance M1 adjacent to the diffraction pattern PT to obtain a difference (also referred to as a "refraction indexes difference (nA−nB)"); and dividing the result of the multiplication by the refraction indexes difference (nA−nB).

$$Dd0 = S \times \lambda / (nA - nB) \quad (2)$$

In the upper layer section 20A of the diffraction element 20 (FIG. 5), the substance that covers the diffraction pattern PT is made from the cover material RA while the diffraction pattern PT is made from the base material RB. Accordingly, the refraction index nA is also represented as a cover material refraction index nA (which is of the cover material RA) while the refraction index nB is also represented as a base material refraction index nB (which is of the base material RB).

In this case, the CD wavelength λc is almost equal to the result of multiplying the BD wavelength λb by the whole number (or two, for example). If the refraction indexes difference (nA−nB) is constant, the value of the zero-order diffraction difference Dd0 of the CD-type optical beam Lc will become substantially equal to that of the zero-order diffraction difference Dd0 of the BD-type optical beam Lb. Therefore, if the value of the zero-order diffraction difference Dd0, one that enables the BD-type optical beam LB to transmit or pass through is set as a set difference d (FIG. 5) for the CD-type diffraction pattern PTc, it also allows the CD-type optical beam Lc to pass through it without being diffracted.

Figure 7A:
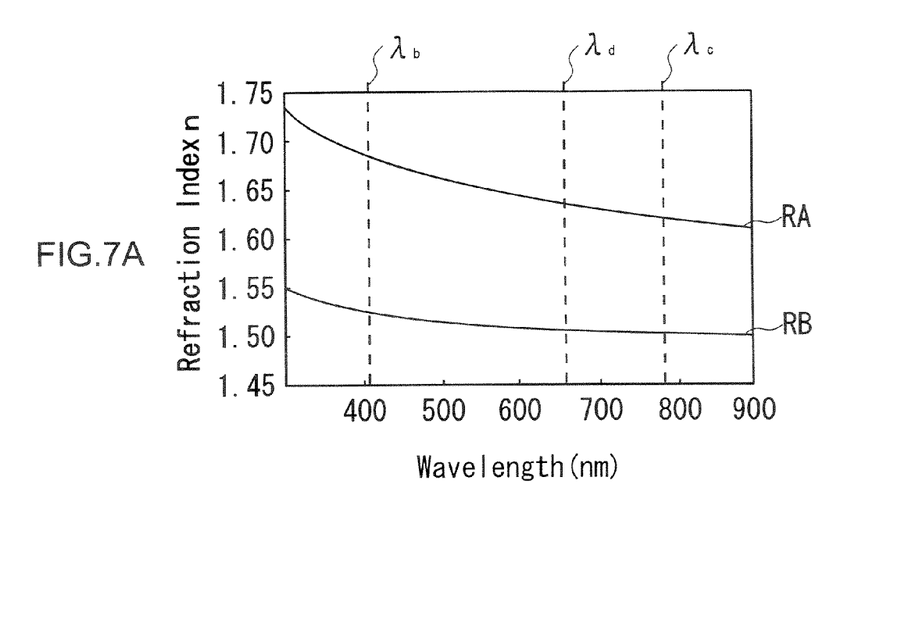
FIGS. 7A and 7B are schematic diagrams illustrating refraction indexes for each wavelength.

Accordingly, as shown in FIG. 7A, the cover material RA and the base material RB are selected such that: the cover material refraction index nA differs from the base material refraction index nB; the cover material RA have high dispersibility of the refraction index n toward the wavelengths of the optical beams; and the base material RB have low dispersibility of the refraction index n toward the wavelengths of the optical beams. That dispersibility is also referred to as "refraction index wavelength dispersibility".

That makes the refraction index difference (nA−nB) of the CD wavelength λc different from the refraction index difference (nA−nB) of the BD wavelength λb to change the denominator of the above equation (2). Thus, the zero-order diffraction difference Dd of the CD-type optical beam Lc becomes different from that of the BD-type optical beam Lb.

Figure 7B:
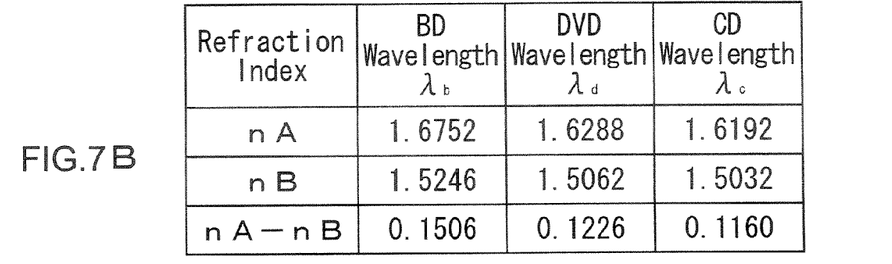

In effect, as shown in FIG. 7B, the cover and base materials RA and RB are selected to have the refraction indexes difference (nA−nB) that allows the BD-type optical beam Lb to pass through the upper layer section 20A while the CD-type optical beam Lc is diffracted.

Then, the zero-order diffraction efficiency EF0 will be the highest in terms of the zero-order diffraction for the BD-type optical beam Lb and the DVD-type optical beam Ld. In addition, a maximum effect difference value to have the highest first-order diffraction efficiency EF1 can be calculated. This maximum effect difference value is set as the set difference d (FIG. 5).

Generally, resins' refractive indexes vary according to temperatures, which is so-called refraction indexes temperature dependency. When the refraction indexes difference (nA−nB) changes as a result of temperature change, the zero-order diffraction difference Dd0 (indicated by the above equation (2)) to have the highest zero-order diffraction efficiency EF0 will be shifted.

Accordingly, the maximum effect difference value of gaining the maximum diffraction efficiency EF (the first-order diffraction efficiency EF1 of the CD-type optical beam Lc, and the zero-order diffraction efficiency EF0 of the BD-type optical beam Lb and DVD-type optical beam Ld) will be away from the set difference d. This lowers the diffraction efficiencies EF for each wavelength λ below the diffraction efficiency EF set by the maximum effect difference value.

In the upper layer section 20A according to this embodiment, keeping the refraction indexes difference (nA−nB) at a substantially constant level, despite temperature change, maintains the diffraction efficiency EF.

Figures 8, 9:
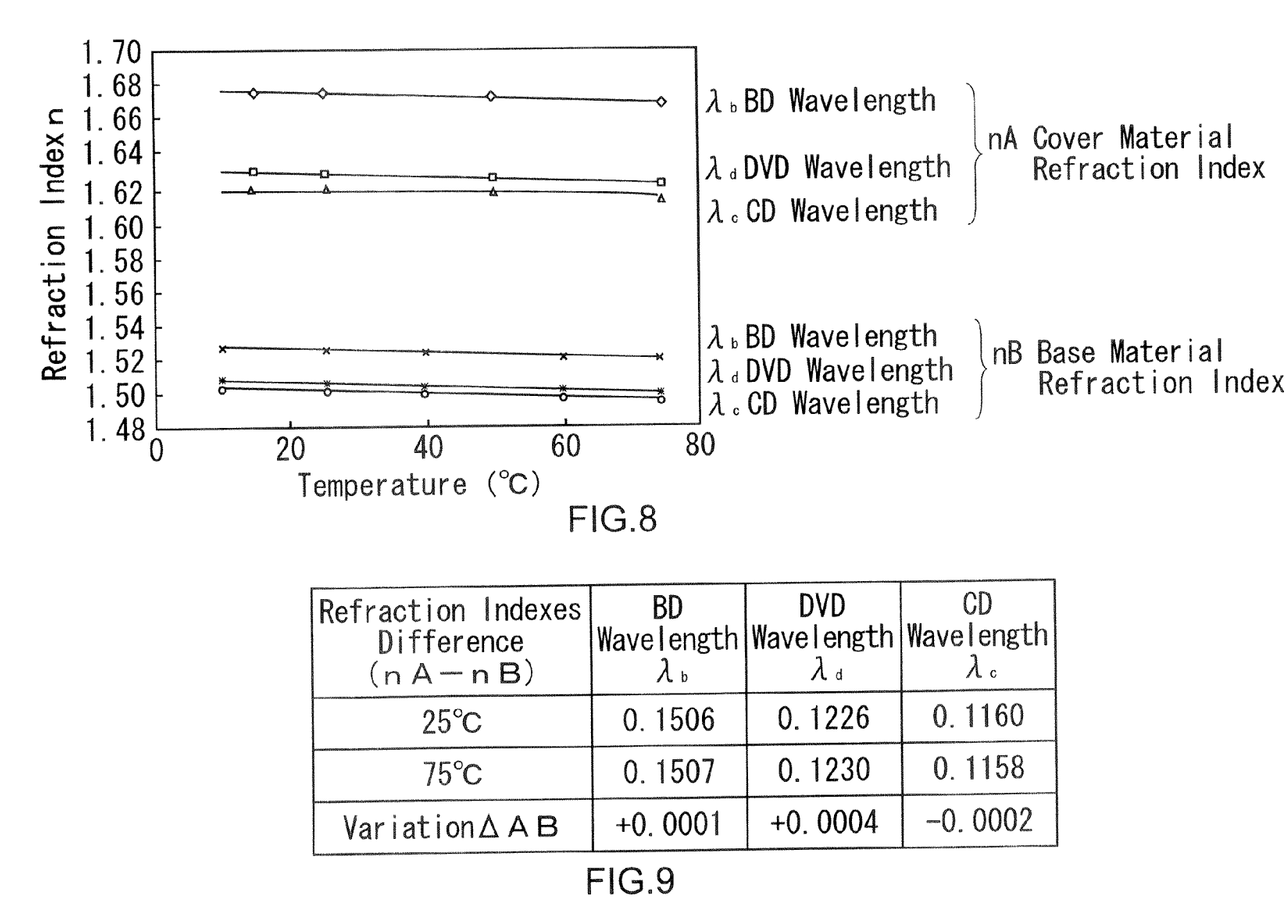
FIG. 8 is a schematic diagram illustrating dependency of refraction indexes to temperatures.
FIG. 9 is a table showing refraction indexes differences with temperatures.

FIG. 8 shows the relation between temperatures and refraction indexes n on the upper layer section 20A. The cover material refraction index nA and base material refraction index nB for each wavelength λ linearly change with temperatures. The cover material RA and the base material RB are selected so that their refraction indexes change at the same rate.

In effect, the refraction indexes difference (nA−nB) is represented by an equation (3) shown below: the refraction indexes difference (nA−nB) is calculated by subtracting nB(t) or the base material refraction index nB from nA(t) or the cover material refraction index nA (t: temperatures). The cover material RA and the base material RB are selected to have the refraction indexes difference (nA−nB) stabilized.

$$(nA-nB) = nA(t) - nB(t) \qquad (3)$$

The refraction indexes difference (nA−nB) is also represented as follows:

$$(nA-nB) = (nA(T) + \Delta nA(+t)) - (nB(T) + \Delta nB(+t)) \qquad (4)$$

where temperatures are represented as T; the variation (or the rate of change) of the cover material refraction index nA when the temperature increased by +t degrees Celsius from T degrees is represented as ΔnA(+t); and the variation (or the rate of change) of the base material refraction index nB is represented as ΔnB(+t).

The equation (4) can be transformed as follows:

$$(nA-nB) = (nA(T) - nB(T)) + (\Delta nA(+t) - \Delta nB(+t)) \qquad (5)$$

The equation (5) indicates that: the variation ΔAB of the refraction indexes difference (nA−nB) becomes substantially zero when the variation ΔnA(+t) of the cover material refraction index nA is the same as the variation ΔnB(+t) of the base material refraction index nB; and the refraction indexes reference (nA−nB) remains unchanged between the temperature T and the temperature T+t.

FIG. 9 illustrates characteristics of the cover and base materials RA and RB: the refraction indexes differences (nA−nB) for BD-wavelength λb, DVD-wavelength λd and CD-wavelength λc are 0.1506 (25 degrees Celsius) and 0.1507 (75 degrees Celsius), 0.1226 and 0.1230, and 0.1160 and 0.1158, respectively.

As mentioned above, the cover material refraction index nA and the base material refraction index nB linearly change with temperatures. Accordingly, if the diffraction indexes difference (nA−nB) remains unchanged between 25 and 75 degrees Celsius, it means that the cover material refraction index nA and the base material refraction index nB change at the substantially same rate in the range of 25 to 75 degrees Celsius. Accordingly, the diffraction efficiency EF can be maintained.

Figure 10:
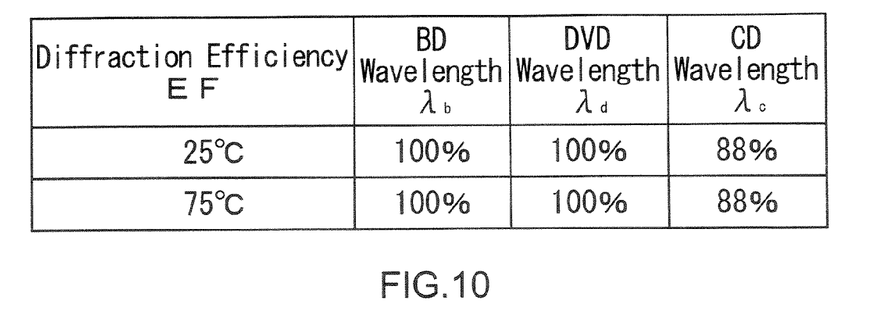
FIG. 10 is a table illustrating changes in diffraction efficiencies in different temperatures.

FIG. 10 illustrates diffraction efficiencies EF with temperatures on the upper layer section 20A: the diffraction efficiency EF for each wavelength λ is stabilized between 25 degrees and 75 degrees Celsius. It means that the diffraction efficiency EF is not affected by temperatures.

In this manner, the cover and base materials are selected such that the cover material refraction index nA and base material refraction index nB increase or decrease at the same rate between 25 and 75 degrees Celsius. This maintains the diffraction efficiency EF despite temperature change.

In the upper layer section 20A according to this embodiment, the variation of the cover material refraction index nA and base material refraction index nB remain unchanged even between −40 and 25 degrees Celsius like the temperature range of 25 to 75 degrees Celsius. The cover material RA and the base material RB are chosen such that the variation ΔAB of the refraction indexes difference (nA−nB) becomes almost zero in the range of −40 and 75 degrees Celsius.

In addition, the diffraction element 20 including the upper layer section 20A may be used in the range of −40 and 75 degrees Celsius. Accordingly, as indicated by an equation (6) shown below, it is desirable that the variation ΔAB of the refraction indexes difference (nA−nB) in the range of −40 and 75 degrees Celsius be zero or at least less than 0.0005.

$$\Delta AB = |\Delta nA(+t) - \Delta nB(+t)| < 0.0005 \qquad (6)$$

Figure 11:
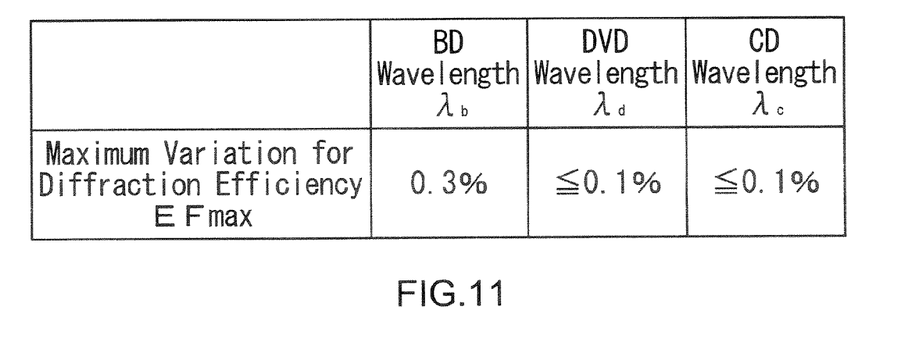
FIG. 11 is a table illustrating the variation of diffraction efficiencies.

When the variation ΔAB of the refraction indexes difference (nA−nB) conforms to the above equation (6), a diffraction efficiency maximum variation EFmax, a maximum value of the variation of the diffraction efficiency EF will be less than 0.3% for each wavelength, which is suitable for practical use between −40 and 75 degrees Celsius (see FIG. 11).

In this embodiment, the glass transition points $Tg_A$ and $Tg_B$ are determined by Dynamic Mechanical Spectrometer in a tension mode in the following conditions: the rate of temperature increase is 2 degrees Celsius per minute; temperature range is 40 to 200 degrees Celsius; the size of samples is 10×20×0.5 mm; the load is 10 g; and the frequency is 1 Hz.

(3) Operation and Effect

The upper layer section 20A of the diffraction element 20 includes the base layer 20C including the CD-type diffraction pattern PTc, and the cover layer 20D covering the base layer 20C. The cover material RA and the base material RB are selected such that the variation of the cover material refraction index nA becomes the same as that of the base material refraction index nB in the range of −40 (also referred to as a "first temperature") and 75 degrees Celsius (also referred to as a "second temperature").

Accordingly, even if temperature changes, the variation of the cover material refraction index nA compensates for the variation of the base material refraction index nB to maintain the refraction indexes difference (nA−nB), a value calculated by subtracting the base material refraction index nB from the cover material refraction index nA at a certain level. This prevents the maximum effect difference value from being changed due to temperature change, wherein the maximum effect difference value is the difference Dd to have the highest efficiencies as for the first-order diffraction efficiency EF1 of the CD-type optical beam Lc, and the zero-oder diffraction efficiency EF0 of the BD- and DVD-type optical beams Lb and Ld. As a result, the set difference d of the CD-type diffraction pattern PTc is maintained, and the diffraction efficiencies EF can be stabilized within the predetermined range.

In addition, the cover material RA and the base material RB are selected such that the variation of the cover material refraction index nA becomes substantially the same as that of the base material refraction index nB in the range of −40 and 75 degrees Celsius. Therefore, the variations of the cover material refraction index nA and base material refraction index nB, the values linearly changing with temperatures are substantially stabilized within the range of −40 and 75 degrees Celsius (this temperature range is determined based on the environment where those products are actually used). As a result, the refraction indexes difference (nA−nB) is stabilized at a predetermined level within that temperature range.

As for the step-like diffraction patterns, the diffraction efficiency EF is calculated as follows:

$$EF = \left| \int f(x) e^{-2\pi i \left(mx - \frac{(nA(t)-nB(t))d}{\lambda}\right)} dx \right|^2 \quad (7)$$

where f(x) is a function regarding the shape of the upper layer section 20A, and "m" is a diffraction order. Since all the values, including the set difference d and the wavelength λ, do not change, the variation of the diffraction efficiency EF when temperature changes is determined by (nA(t)−nB(t)).

Accordingly, the diffraction efficiency EF is stabilized because the cover material RA and the base material RB are selected so as to provide the substantially constant refraction indexes difference (nA−nB) or (nA(t)−nB(t)) in the equation (3).

By the way, it is well known that general resins for optical parts have molecular chains which begin to be dramatically thermalized around 10 degrees Celsius below the glass transition point, resulting in change in physical property such as volumes and elastic modulus. The rate of change of the refraction indexes n may be changed according to temperature change.

In this upper layer section 20A, the glass transition point $Tg_A$ of the cover material RA is 88 degrees Celsius, and the glass transition point $Tg_B$ of the base material RB is 168 degrees Celsius. In this manner, those glass transition points Tg are 10 degrees higher than 75 degrees Celsius or the maximum of that temperature range.

That prevents deformation of the upper layer section 20A within that temperature range of −40 to 75 degrees Celsius. This avoids increasing the variation of the refraction indexes with respect to temperature changes, and the diffraction efficiency EF is stabilized within that temperature range.

The above configuration of the upper layer section 20A of the diffraction element 20 makes this possible: the variation of the cover material refraction index nA compensates for that of the base material refraction index nB in that temperature range because the cover material RA and the base material RB are selected such that the rate of change of the cover material refraction index nA is almost the same as that of the base material refraction index nB in that temperature range. Accordingly, the refraction indexes difference (nA−nB), the value calculated by subtracting the base material refraction index nB from the cover material refraction index nA is stabilized. Thus, the diffraction efficiency EF is maintained even if temperature changes.

(4) Other Embodiments

In the above-noted embodiments, the upper layer section 20A diffracts the CD-type optical beam Lc while the BD- and DVD-type optical beams Lb and Ld are transmitted without being diffracted. However, the present invention is not limited to this. There may be many variations for wavelengths λ and the like: At least, for example, one optical beam with a certain wavelength is diffracted and another optical beam with another wavelength is also diffracted.

In addition, in the above-noted embodiments, the temperature range of −40 to 75 degrees Celsius is determined based on the environment where those products are actually used. However the present invention is not limited to this. Other temperature ranges may be selected on the basis that: they are about 10 degrees Celsius below the glass transition points $Tg_A$ and $Tg_B$; and they are selected from a temperature range where the cover material refraction index nA and the base material refraction index nB linearly change with temperatures.

Moreover, in the above-noted embodiments, it is allowed to change the refraction indexes difference (nA−nB) for the BD and CD wavelengths λb and λc. This allows the refraction indexes difference (nA−nB) for the BD-type optical beams Lb and the refraction indexes difference (nA−nB) for the CD-type optical beam Lc to change, wherein the wavelength of the CD-type optical beam Lc is substantially equal to that of the BD-type optical beam Lb multiplied by the whole numbers. However the present invention is not limited to this. For example, the wavelength of the CD-type optical beam Lc may not be equal to that of the BD-type optical beam Lb multiplied by the whole numbers. To adjust the diffraction efficiency EF, the refraction indexes difference (nA−nB9) for those beams may change.

Furthermore, to change the refraction indexes difference (nA−nB) for the BD and CD wavelengths λb and λc, the CD-type diffraction pattern PTc of the base layer 20C is covered with the cover layer 20D. However the present invention is not limited to this. The cover layer 20D may be provided to compensate for temperature-variation dependency of the base layer 20D only. In this case, in terms of dispersion of the refraction indexes to the wavelengths, any materials can be used as the base and cover materials RA and RB.

Furthermore, in the above-noted embodiments, the cover materials RA is an ultraviolet curable resin while the base material RB is a thermoplastic resin. However the present invention is not limited to this. Two different resins may be selected for the cover and the base materials, out of thermoplastic resins, thermosetting resins and ultraviolet curable resins.

Furthermore, the cover material RA is acrylic while the base material RB is made from cyclo olefin polymer or the like. However the present invention is not limited to this. Various materials can be used.

In the above-noted embodiments, the glass transition points $Tg_A$ and $Tg_B$ of the cover material RA and base material RB are higher than 85 degrees Celsius. However the present invention is not limited to this. Other materials whose glass transition points Tg are below 85 degrees Celsius may be used if they are hardly deformed thanks to different curing techniques or different molecular weight distribution.

Furthermore, in the above-noted embodiments, the CD-type diffraction pattern PTc is covered with the cover layer 20D whose surface is flat. However the present invention is not limited to this. There may be concavity-and-convexity patterns on the surface of the cover layer 20D for some reason.

Furthermore, in the above-noted embodiments, the optical pickup supports three types of format: BD, DVD and CD. However the present invention is not limited to this. The optical pickup may support other formats such as High Definition (HD).

Furthermore, in the above-noted embodiments, the diffraction element 20 includes: the base layer 20 or a base section made from the base material RB or a first resin; and the cover layer 20D or a cover section made from the cover material RA or a second resin. However the present invention is not limited to this. The diffraction element 20 may include other components, including the base section and cover section.

The diffraction element, objective lens unit, optical pickup and optical disc apparatus according to an embodiment of the present invention can be applied to optical disc drives for various electronics, for example.

It should be understood by those skilled in the art that various modifications, combinations, sub-combinations and alterations may occur depending on design requirements and other factors insofar as they are within the scope of the appended claims or the equivalents thereof.

What is claimed is:

1. A diffraction element for diffracting a particular wavelength of an incident optical beam, the diffraction element including:
    a base section made from a first resin and provided with a predetermined diffraction pattern; and
    a cover section made from a second resin and covering the diffraction pattern, wherein
        a rate of change of refraction index of the first resin is substantially the same as a rate of change of refraction index of the second resin in a temperature range between a first temperature and a second temperature,
        glass transition points of the first resin and the second resin are greater or equal to 85 degrees Celsius, and
        the first resin is ultraviolet curable resin while the second resin is thermoplastic resin.

2. The diffraction element according to claim 1, wherein the first temperature is −40 degrees Celsius while the second temperature is 75 degrees Celsius.

3. The diffraction element according to claim 1, wherein a difference between the rate of change of refraction index of the first resin and the rate of change of refraction index of the second resin is less than ±0.0005 in the temperature range of −40 degrees Celsius to 75 degrees Celsius.

4. The diffraction element according to claim 1, wherein when the optical beam having a plurality of wavelengths is received, the rate of change of refraction index of the first resin is substantially the same as the rate of change of refraction index of the second resin in a temperature range between the first temperature and the second temperature.

5. The diffraction element according to claim 1, wherein
    a first wavelength of the optical beam is diffracted; and
    a refraction indexes difference for the first wavelength of the optical beam is different from that of a second wavelength of the optical beam, the refraction indexes difference being between the refraction index of the first resin and the refraction index of the second resin.

6. The diffraction element according to claim 5, wherein the first wavelength is substantially equal to the second wavelength multiplied by a whole number.

7. An objective lens unit, including:
    a diffraction element for diffracting a particular wavelength of an incident optical beam from a light source, the diffraction element including a base section made from a first resin and provided with a predetermined diffraction pattern and a cover section made from a second resin and covering the diffraction pattern; and
    an objective lens integrated with the diffraction element and emitting the optical beam to an optical disc after collecting the optical beam from the diffraction element, wherein
        a rate of change of refraction index of the first resin is substantially the same as a rate of change of refraction index of the second resin in a temperature range between a first temperature and a second temperature,
        glass transition points of the first resin and the second resin are greater or equal to 85 degrees Celsius, and
        the first resin is ultraviolet curable resin while the second resin is thermoplastic resin.

8. An optical pickup, including:
    a light source emitting an optical beam;
    an objective lens emitting the optical beam to an optical disc after collecting the optical beam; and
    a diffraction element for diffracting a particular wavelength of the incident optical beam to the objective lens, the diffraction element including a base section made from a first resin and provided with a predetermined diffraction pattern and a cover section made from a second resin and covering the diffraction pattern, wherein
        a rate of change of refraction index of the first resin is substantially the same as a rate of change of refraction index of the second resin in a temperature range between a first temperature and a second temperature,
        glass transition points of the first resin and the second resin are greater or equal to 85 degrees Celsius, and
        the first resin is ultraviolet curable resin while the second resin is thermoplastic resin.

9. An optical disc apparatus, including:
    a light source emitting an optical beam;
    an objective lens emitting the optical beam to an optical disc after collecting the optical beam;
    a diffraction element for diffracting a particular wavelength of the incident optical beam to the objective lens, the diffraction element including a base section made from a first resin and provided with a predetermined diffraction pattern and a cover section made from a second resin and covering the diffraction pattern; and
    a drive section to have the objective lens focused on a target track of the optical disc, wherein
        a rate of change of refraction index of the first resin is substantially the same as a rate of change of refraction index of the second resin in a temperature range between a first temperature and a second temperature,
        glass transition points of the first resin and the second resin are greater or equal to 85 degrees Celsius, and
        the first resin is ultraviolet curable resin while the second resin is thermoplastic resin.

* * * * *